United States Patent
Webb et al.

[11] Patent Number: 5,917,941
[45] Date of Patent: Jun. 29, 1999

[54] CHARACTER SEGMENTATION TECHNIQUE WITH INTEGRATED WORD SEARCH FOR HANDWRITING RECOGNITION

[75] Inventors: Brandyn Webb, Oceanside; Larry S. Yaeger, Los Gatos, both of Calif.

[73] Assignee: Apple Computer, Inc., Cupertino, Calif.

[21] Appl. No.: 08/512,330

[22] Filed: Aug. 8, 1995

[51] Int. Cl.⁶ .................................................. G06K 9/72
[52] U.S. Cl. ........................ 382/177; 382/187; 382/231; 382/309
[58] Field of Search .................................. 382/229, 230, 382/231, 177, 178, 179, 186–189, 309, 310, 226, 228; 707/530, 531, 532, 533, 534

[56] References Cited

U.S. PATENT DOCUMENTS

| | | | |
|---|---|---|---|
| 4,589,142 | 5/1986 | Bednar | 382/226 |
| 4,672,571 | 6/1987 | Bass et al. | 707/533 |
| 4,750,122 | 6/1988 | Kaji et al. | 704/1 |
| 4,754,489 | 6/1988 | Bokser | 382/230 |
| 4,847,912 | 7/1989 | Tanaka et al. | 382/171 |
| 5,067,165 | 11/1991 | Nishida | 382/195 |
| 5,161,245 | 11/1992 | Fenwick | 382/231 |
| 5,367,453 | 11/1994 | Capps et al. | 707/531 |
| 5,467,407 | 11/1995 | Guberman et al. | 382/186 |
| 5,544,259 | 8/1996 | McCubbrey | 382/177 |

*Primary Examiner*—Jon Chang
*Attorney, Agent, or Firm*—Burns, Doane, Swecker & Mathis, L.L.P.

[57] ABSTRACT

After each complete stroke in a handwriting recognition process, a hypothesis is generated whether a word break is present between the previous stroke and the new stroke. This hypothesis is weighted with a probability of a word-break occurring between the strokes. This probability is determined from the geometrical relationships between characters. Subsequently, a word search is carried out on the basis of these weighted hypotheses, to identify the most likely candidates for the words represented by the written strokes. A user interface is provided that offers the user a limited list of alternative word recognitions for a group of characters. These recognitions undergo segmentation filtering, in accordance with the word breaks of the selected hypotheses, to present the user with only those alternatives having the same groupings of strokes.

13 Claims, 1 Drawing Sheet

| PATTERN | TYPE | PROB. OF USAGE CORRECT/INCORRECT | | ERROR FACTOR LABEL CLASS/OTHER | |
|---|---|---|---|---|---|
| cl | POSITIVE | 0.5 | 1.0 | 1.0 | 0.1 |
| o | POSITIVE | 0.5 | 1.0 | 1.0 | 0.1 |
| g | POSITIVE | 0.5 | 1.0 | 1.0 | 0.1 |
| c | NEGATIVE | 0.18 | | 0.3 | |
| c\|o | NEGATIVE | 0.18 | | 0.3 | |
| l | NEGATIVE | 0.18 | | 0.3 | |
| \|o | NEGATIVE | 0.18 | | 0.3 | |
| og | NEGATIVE | 0.18 | | 0.3 | |

| PATTERN | TYPE | PROB. OF USAGE CORRECT/INCORRECT | | ERROR FACTOR LABEL CLASS/OTHER | |
|---|---|---|---|---|---|
| cl | POSITIVE | 0.5 | 1.0 | 1.0 | 0.1 |
| o | POSITIVE | 0.5 | 1.0 | 1.0 | 0.1 |
| g | POSITIVE | 0.5 | 1.0 | 1.0 | 0.1 |
| c | NEGATIVE | 0.18 | | 0.3 | |
| clo | NEGATIVE | 0.18 | | 0.3 | |
| l | NEGATIVE | 0.18 | | 0.3 | |
| lo | NEGATIVE | 0.18 | | 0.3 | |
| og | NEGATIVE | 0.18 | | 0.3 | |

CHARACTER SEGMENTATION TECHNIQUE WITH INTEGRATED WORD SEARCH FOR HANDWRITING RECOGNITION

FIELD OF THE INVENTION

The present invention is generally directed to the field of word recognition, particularly handwriting recognition, and more specifically to the procedure by which different written strokes are grouped and segmented to identify words.

BACKGROUND OF THE INVENTION

The automated recognition of handwriting generally involves three main steps. As a first step, individual strokes that are written by a person are preprocessed and tentatively segmented into different groups which might correspond to respective characters. In the second step of the process, the pattern formed by each segmented group of strokes is analyzed to determine whether it represents a recognizable character. Typically, this step might be carried out in a neural network, which produces output values that are related to the probability that a given group of strokes represents a particular character. In the third step of the process, the various probabilities regarding different characters undergo a word recognition search to identify one or more possible words which the written strokes represent.

As part of this process, another segmentation procedure is carried out, to properly assign the various characters to respective words. Typically, this form of segmentation is determined by analyzing the geometric relationships between the various hand-written characters. Since the individual letters of a written word normally have a small spacing between them, whereas the spacing between different words is much greater, the relative spacings between characters can be used to detect word breaks. In the past, a thresholding technique was employed in the stoke preprocessing step to segment characters into different words. For example, the spaces between successive characters were measured, to derive an average, or nominal value. This nominal value was used to establish a threshold, or maximum value. If the space between two characters exceeded the threshold value, a word break was inserted between the two characters.

While such an approach may be well-suited for ideal cases, in practice it does not always produce good results, because of the wide variances between the handwriting of different individuals. When quickly jotting notes in a personal information manager, for example, an individual does not always pay close attention to the spacing between strokes. In such a situation, a fixed thresholding approach does not provide sufficient flexibility to accommodate the nuances of different handwriting styles.

Accordingly, it is an objective of the present invention to provide a technique for segmenting different groups of strokes into words, which inherently provides flexibility to accommodate irregular spacings of strokes in the recognition of words.

SUMMARY OF THE INVENTION

In accordance with the present invention, the foregoing objective is achieved by generating and storing multiple hypotheses regarding the location of word breaks, as character strokes are analyzed. At appropriate steps in the recognition process, for example after each complete stroke, a hypothesis is generated whether a word break is present between the previous stroke and the new stroke. This hypothesis is weighted with a probability of a word-break occurring between the strokes. This probability is determined from the geometrical relationships between characters. Subsequently, a word search is carried out on the basis of these weighted hypotheses, to identify the most likely candidates for the words represented by the written strokes. Thus, rather than forcing a word break between adjacent characters at an early stage in the handwriting analysis, the approach of the present invention integrates word segregation with character recognition, to thereby improve the accuracy of the word recognition process.

As a further feature of the invention, a user interface is provided that offers the user a list of candidate words for a group of characters. Once the most likely word-break hypothesis is determined, segmentation filtering is used to identify other hypotheses that share the same word breaks as the likely candidate. All of these hypotheses which share a common set of word breaks are then displayed to the user.

Further features of the invention, and the advantages obtained thereby, are described in detail hereinafter with reference to specific examples illustrated in the accompanying figures.

DETAILED DESCRIPTION

Figures 1, 2, 3:
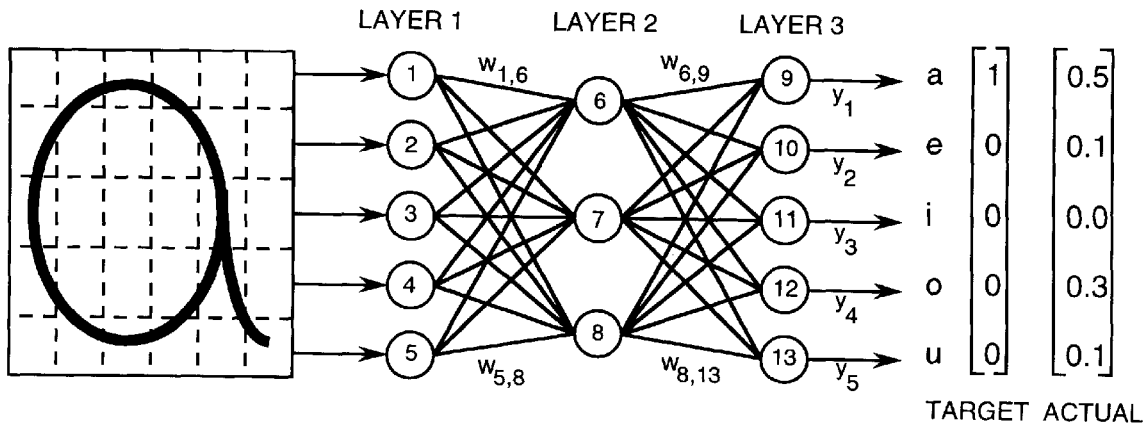
FIG. 1 is a general block diagram of a system for automated handwriting recognition.
FIG. 2 is an example of hand-written characters.
FIG. 3, is an illustration of hypotheses generated from the example of FIG. 2, with assigned weight values.

A handwriting recognition system, of the type in which the present invention can be implemented, is illustrated in general block diagram form in FIG. 1. Referring thereto, a user writes characters on an input device 10. This input device can be, for example, a pen-based electronic tablet, or any other suitable device which is capable of detecting strokes entered by a user. Handwriting strokes entered on the tablet are recorded and provided to a stroke preprocessing and tentative segmentation stage 12. In this stage, various features relating to the input of the characters are detected. For example, if classification into letters is based on images of the stroke patterns, these images can be quantized in the preprocessing stage. Alternatively, if character recognition is based on stroke features, e.g., the orientation of successive segments in a stroke, these features are measured in the preprocessing stage. In addition, the strokes are segmented into different groupings that may pertain to different respective characters.

The information obtained in the preprocessing and segmentation stage is provided to a character recognizer, or classifier 14. Preferably, this classifier is implemented in the form of a neural network. The neural network provides output signals indicative of the probability that a given group of strokes represents a particular character, in a known manner. This information is provided to a word search engine 16, together with information relating to geometric relationships of the strokes, as provided by the stroke preprocessor. Within the search engine, the various probabilities regarding recognized characters are evaluated, for example relative to one or more dictionaries 18, to produce a final output which indicates one or more words that are likely represented by the input strokes. This output might be displayed, for example, on a display device 20.

Depending upon the environment in which the handwriting recognition system is employed, the user may enter multiple words at a time. As part of the word recognition process, therefore, a determination must be made where the breaks between successive words occur. When the words are neatly printed by the user, such a determination can be made relatively easily by measuring the distances between successive characters.

In practice, however, typical users are not always careful about the relative spacing between characters. FIG. 2 illustrates an example in which a user has written the words "dog" and "man" in succession on the input device 10. Ideally, the space between the ending "g" of the word "dog" and the beginning "m" of the word "man" is much greater than the spaces between the individual characters of each word. If, however, the user writes the words such that the space between the two words is the same as, or not much greater than, the space between individual characters, the search engine may not recognize the need for a word break. In fact, if the ending letter "n" of the word "man" is sufficiently spaced from the "a" in "man," the thresholding approach may consider the "n" to be the start of a new word, and interpret the first five characters as the word "dogma."

In accordance with the present invention, the segmentation of characters into words is not performed with a hard rule approach, such as thresholding. Rather, at appropriate points in the character recognition process, a hypothesis is generated as to the probability that a word break, or space, exists between recognized characters. Multiple hypotheses are generated and then searched, to determine the location of word breaks, and thereby the segmentation of characters into words.

Preferably, the formation of a word-break hypothesis is carried out after each character is detected. With reference to the example of FIG. 2, the successive steps that are carried out in the process of the invention are illustrated in FIG. 3. In the first step, the character "d" is detected and stored in a memory. Since this is only a single character, no word-break hypothesis is formed. In the second step, the letter "o" is detected. At this point, there are two possibilities, namely that the two letters belong to the same word, or they belong to separate words. These two possibilities are stored in a memory in the word search stage 16, and each is weighted with an associated "space probability." For purposes of illustration, in FIG. 3 the existence of a definable space, i.e., a word break, between two characters is indicated by a large dot. The space probability is determined from the geometrical relationship between the characters, as detected in the stroke preprocessing stage 12, in which the distances between successive strokes are measured. If the characters are relatively close to one another, the space probability is low. Conversely, if they are located a distance from one another, the space probability is higher. Assuming, for purposes of this example, that the two characters are placed relatively close to one another, the two possibilities are weighted such that the likelihood of no space is relatively high, e.g., 0.7, whereas the likelihood of a space is much lower, e.g., 0.3.

In the third step, after the letter "g" is recognized, a new set of hypotheses is generated, with various combinations of spaces and no spaces between successive letters. Again, each hypothesis is given an associated weight, which is related to the spacing between the characters. The process continues in this manner, to generate multiple weighted hypotheses after each character is recognized. The last step in FIG. 3 illustrates one example of the hypotheses that can be generated from the example of FIG. 2, and their respective weights.

The various word break hypotheses are used in a word search technique, to locate the most likely word-break probability. The hypotheses with the highest probabilities are searched against a dictionary of known words. Preferably, the word search is carried out upon detecting that a certain period of time has elapsed since the last stroke was entered. In such a case, it can be assumed that the user has stopped writing, and therefore the entered information constitutes one or more whole words. Thus, the word search will look for a valid word that ends with the character(s) last entered by the user. In the example of FIG. 3, the two hypotheses "dog man" and "dogma n" have equal probabilities. In the present example, each of the words "dog," "man," and "dogma" might appear in the dictionary. However, if the letter "n" does not appear as a separate item in the dictionary, the search will select the hypothesis "dog man" as the most likely possibility.

As noted above, the probability that is assigned to each hypothesis is based upon the geometric relationships of the characters. For example, as successive characters are written, the minimum and maximum spaces between them can be stored, to define a range. The probability of a word break between any two characters can be determined on the basis of where the space between the two characters falls within the recorded range. In other words, if the space between two characters is small, it will fall into the lower end of the range, and thereby have a low word-break probability. Conversely, if the space between two characters is large, it will be at the high end of the range, and therefore have a higher word-break probability. The relationship of the probability to the measured distance can be of an arbitrary form, but is preferably defined in terms of a Gaussian distribution based on measured standard deviations about a measured mean. For three or more successive characters, the probabilities of their various hypotheses can be the product of the space/no-space probabilities of each successive pair.

As a further feature of the invention, segmentation filtering based upon the hypotheses can be employed to provide a user interface on the display 20. Typically, in a user interface for handwriting recognition, the user is provided with a number of alternatives, showing different possible words. In the preferred embodiment of the present invention, the alternatives that are provided to the user are selected from those hypotheses which share common word breaks with the surviving hypothesis.

In the example of FIG. 3, the most likely hypothesis is "dog man." In the user interface, this selected possibility is displayed, as well as other hypotheses in which the word break has been inserted between the same groups of strokes. For example, during character recognition, the two strokes which form the letter "d" could have also been interpreted as two separate letters, i.e. "cl". In such a case, "clog man" would be another possibility. Since this hypothesis shares the same word break as "dog man", it is also displayed to the user as a possible alternative.

Of course, it is also possible to display alternatives to the user without employing such segmentation filtering. For example, the top rated hypotheses might simply be displayed in order below the selected one.

From the foregoing, it can be seen that the present invention provides a word segmentation technique having a great deal of flexibility. Rather than segmenting characters at an early stage of the process according to a hard, thresholding rule, multiple hypotheses are generated and weighted according to the geometrical relationships of characters. These hypotheses are integrated with the character recognition process to locate the most likely segmentation of characters, and hence provide better results for word recognition.

In addition, to improved recognition results, the process of the present invention can be used to expedite the word recognition process. More particularly, a limit can be placed on the number of hypotheses that are stored for the word search. As each new set of hypotheses is generated, only a predetermined number are retained e.g., 25. If any of the new hypotheses has a probability which is higher than those retained from a previous step, it is stored in the list and the one with lowest probability is dropped. Thus, when the word search is conducted, it is limited to a fixed number of hypotheses with the highest probabilities, rather than all possible hypotheses, thereby reducing the time required to conduct the search.

It will be appreciated by those of ordinary skill in the art that the present invention can be embodied in other forms without departing from the spirit or essential characteristics thereof. The presently disclosed embodiments are considered in all respects to be illustrative, and not restrictive. The scope of the invention is indicated by the appended claims, rather than the foregoing description, and all changes that come within the meaning and range of equivalence thereof are intended to be embraced therein.

What is claimed is:

1. A method for segmenting plural recognized characters into words in a handwriting recognition process, comprising the steps of:
   generating hypotheses pertaining to respective combinations of characters having word-break spaces at different locations between the characters;
   assigning a weight value to each hypothesis;
   searching the hypotheses having the highest weight values, relative to a dictionary of recognized words; and
   selecting the hypothesis whose combination of characters and word break spaces most closely matches entries in the dictionary.

2. The method of claim 1 wherein the weight value is related to spacing between adjacent hand-written characters.

3. The method of claim 1 wherein said step of generating hypotheses is carried out after each hand-written character is recognized.

4. The method of claim 1 further including the step of displaying a plurality of hypotheses, including the selected hypothesis.

5. The method of claim 4 further including the step of limiting the displayed hypotheses to those having the same word breaks as the selected hypothesis.

6. A handwriting recognition system, comprising:
   an input device in which a user enters handwritten strokes;
   a stroke processor for measuring distances between strokes;
   a character classifier for classifying groups of strokes into recognized characters; and
   a word recognition device for generating output signals indicative of possible words represented by the handwritten strokes, said word recognition device including:
   means for generating hypotheses pertaining to respective combinations of characters having word-break spaces at different locations between the characters, and for assigning a weight value to each hypothesis;
   means for searching the hypotheses having the highest weight values relative to a dictionary of recognized words; and
   means for selecting the hypothesis whose combination of characters and word break spaces most closely matches entries in the dictionary.

7. The system of claim 6 wherein the weight value is related to the measured distance between adjacent handwritten strokes.

8. The system of claim 6 wherein said hypothesis generating means generates hypotheses after each group of strokes is classified by said classifier.

9. The system of claim 6 further including a display device for displaying a plurality of hypotheses, including the selected hypothesis.

10. The system of claim 9 further including means for limiting the displayed hypotheses to those having the same word breaks as the selected hypothesis.

11. A method for identifying words within handwritten characters, comprising the steps of:
    receiving strokes entered by a user and classifying one or more strokes as a possible character;
    receiving additional strokes entered by a user and classifying said additional strokes as additional possible characters;
    grouping successive possible characters into combinations having word-break spaces at different respective locations between the possible characters to form word hypotheses, and assigning a weight value to each word hypothesis based upon a geometric relationship between the strokes comprising the possible characters;
    searching the hypotheses having the highest weight values, relative to a dictionary of recognized words; and
    selecting the hypothesis whose combination of characters and word break spaces most closely matches entries in the dictionary.

12. The method of claim 11 wherein said geometric relationship is the spacing between strokes.

13. A method for identifying words within handwritten characters, comprising the steps of:
    receiving strokes entered by a user and classifying one or more strokes as a possible character;
    receiving additional strokes entered by a user and classifying said additional strokes as a second possible character;
    grouping said two possible characters into combinations having word-break spaces at different respective locations between the possible characters to form word hypotheses, and assigning a weight value to each word hypothesis based upon a geometric relationship between the strokes comprising the two possible characters;
    receiving additional strokes entered by the user and classifying said additional strokes as successive possible characters;
    after each successive possible character is classified, forming additional word hypothesis having word-break spaces at different respective locations between the possible characters, and assigning a weight value to each word hypothesis;
    searching the hypotheses having the highest weight values, relative to a dictionary of recognized words; and
    selecting the hypothesis whose combination of characters and word break spaces most closely matches entries in the dictionary.

* * * * *